(12) United States Patent
Keller et al.

(10) Patent No.: US 8,981,036 B2
(45) Date of Patent: Mar. 17, 2015

(54) SYNTHESIS OF AND CURING ADDITIVES FOR PHTHALONITRILES

(71) Applicants: Teddy M. Keller, Fairfax Station, VA (US); Matthew Laskoski, Springfield, VA (US)

(72) Inventors: Teddy M. Keller, Fairfax Station, VA (US); Matthew Laskoski, Springfield, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/483,264

(22) Filed: Sep. 11, 2014

(65) Prior Publication Data

US 2014/0378642 A1    Dec. 25, 2014

Related U.S. Application Data

(63) Continuation-in-part of application No. 14/287,316, filed on May 27, 2014, now Pat. No. 8,859,712, which is a continuation-in-part of application No. 13/833,118, filed on Mar. 15, 2013, now Pat. No. 8,735,532.

(60) Provisional application No. 61/678,686, filed on Aug. 2, 2012.

(51) Int. Cl.
  *C08G 65/38* (2006.01)
  *C08G 67/00* (2006.01)
  *C08G 73/02* (2006.01)
  *C08G 65/40* (2006.01)

(52) U.S. Cl.
  CPC ............... *C08G 67/00* (2013.01); *C08G 65/40* (2013.01); *C08G 73/024* (2013.01)
  USPC ........... 528/210; 427/412; 428/395; 558/371; 568/315

(58) Field of Classification Search
  USPC ........ 427/412.1; 428/395; 528/210; 558/371; 568/315
  See application file for complete search history.

(56) References Cited

U.S. PATENT DOCUMENTS 4,200,728 A  *  4/1980  Blinne et al. .................. 528/174

FOREIGN PATENT DOCUMENTS

GB    1078234 A    8/1967
SU    1509352    *  9/1989

* cited by examiner

*Primary Examiner* — Terressa Boykin
(74) *Attorney, Agent, or Firm* — US Naval Research Laboratory; Joseph T. Grunkemeyer

(57) ABSTRACT

A composition having a mixture of the below compounds having a mole ratio of at least 1:20. $Ar^1$ and $Ar^2$ are independently selected aromatic groups. A composition comprising phthalonitrile compounds that comprise at least 5 mol % of the first compound below.

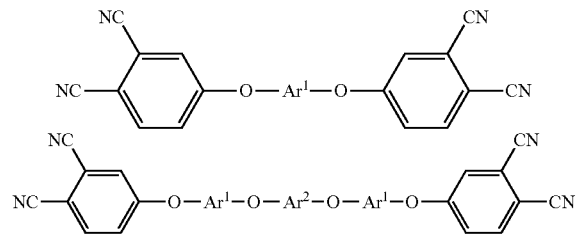

A method of: providing a solution of a dichloroaromatic compound having an electron-withdrawing group bound to each aromatic ring containing one of the chloride groups; a dihydroxyaromatic compound or anion thereof; an organic transition metal complex or a transition metal salt; an alkaline hydroxide base; and a solvent; and heating the solution to a temperature at which the dichloroaromatic compound and the dihydroxyaromatic compound react to form a dimetallic salt of an aromatic ether oligomer. The molar ratio of the dihydroxyaromatic compound to the dichloroaromatic compound is greater than 2:1. Water formed during the heating is concurrently distilled from the solution.

27 Claims, No Drawings

SYNTHESIS OF AND CURING ADDITIVES FOR PHTHALONITRILES

This application is a continuation-in-part application of allowed U.S. application Ser. No. 14/287,316, filed on May 27, 2014, which is a continuation-in-part application of U.S. Pat. No. 8,735,532, filed on Mar. 15, 2013 and issued on May 27, 2014, which claims the benefit of U.S. Provisional Application No. 61/678,686, filed on Aug. 2, 2012. These applications and all other publications and patent documents referred to throughout this nonprovisional application are incorporated herein by reference.

TECHNICAL FIELD

The present disclosure is generally related to synthesis of oligomeric phthalonitriles and low temperature curing additives for phthalonitriles.

DESCRIPTION OF RELATED ART

Phthalonitrile-based polymers exhibit superior flammability and high temperature properties relative to other high temperature polymers. The phthalonitrile technology may be used to replace polyimides for aircraft applications and vinyl esters/epoxy resins for ship applications due to their improved processability and superior physical characteristics. Phthalonitrile resins may show potential as matrix materials for advanced composites for numerous applications. Until the synthesis of the oligomeric aromatic phthalonitrile, the polymerization reactions had to be performed at temperatures at or greater than 250° C., which is slightly greater than the melting point of the first generation aromatic phthalonitriles, synthesized from the salts of the bisphenols and 4-nitrophthalonitrile. The phthalonitrile monomers polymerize through the cyano groups with the aid of an appropriate curing agent to yield a crosslinked polymeric network with high thermal and oxidative stabilities. These polymers are obtained by heating the phthalonitrile monomers and a small amount of curing additive in the melt-state at or above 250° C. for extended periods of time for conversion to a solid followed by postcuring to 450° C. to obtain full cure. Full cure is designated as phthalonitrile solid polymer/composite that does not exhibit a glass transition temperature. In addition, the high aromatic content of the thermoset affords a high char yield (80-90%) when pyrolyzed to 1000° C. under inert conditions. The high thermal stability and the ability to form a high char yield (very little gas formation) upon pyrolysis contribute to the outstanding fire performance of the phthalonitrile polymer. For instance, the fire performance of phthalonitrile-carbon and phthalonitrile-glass composites are superior to that of other thermoset-based composites currently in use for aerospace, ship and submarine applications. The phthalonitriles are still the only polymeric material that meets MIL-STD-2031 for usage inside of a submarine. Moreover, a low viscosity resin enables composite processing by resin transfer molding (RTM), filament winding, and resin infusion molding (RIM) methods and potentially by automated composite manufacturing techniques such as automated tape laying and automated fiber placement. Furthermore, a low melt viscosity and a larger processing window are useful for fabrication of thick composite sections where the melt has to impregnate into thick fiber performs.

BRIEF SUMMARY

Disclosed herein is a composition comprising a mixture of: a first compound having the formula:

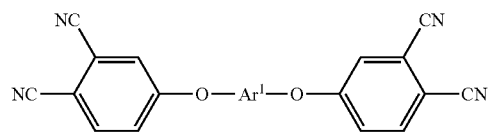

and a second compound having the formula:

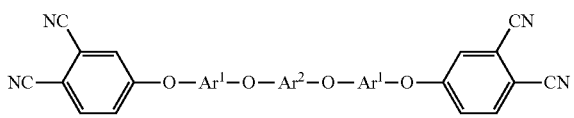

$Ar^1$ and $Ar^2$ are independently selected aromatic groups, and the mole ratio of the first compound to the second compound is at least 1:20.

Also disclosed herein is a composition comprising phthalonitrile compounds that comprise at least 5 mol % of the first compound.

Also disclosed herein is a method comprising: providing a solution comprising a dichloroaromatic compound comprising an electron-withdrawing group bound to each aromatic ring containing one of the chloride groups; a dihydroxyaromatic compound or anion thereof; wherein the molar ratio of the dihydroxyaromatic compound to the dichloroaromatic compound is greater than 2:1; an alkaline hydroxide base; and a solvent; and heating the solution to a temperature at which the dichloroaromatic compound and the dihydroxyaromatic compound react to form a dimetallic salt of an aromatic ether oligomer. Water formed during the heating is concurrently distilled from the solution.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Until recently, bisphenol-based and oligomeric aromatic phthalonitrile polymers were partially cured to the solid at temperatures of about 250° C. Disclosed herein is a method for the synthesis of oligomeric aromatic ether-aromatic ketone containing phthalonitriles and the polymerization of oligomeric phthalonitrile monomers containing multiple aromatic ether moieties between the terminal phthalonitrile units to a shaped solid below 250° C. in the presence of a combination of a curing agent such as a metal salt and strong inorganic and/or organic acid and conversion of the B-staged and gelled phthalonitrile to a fully cured polymer at elevated temperatures in excess of 150° C. to 500° C.

The improved method involves the reaction of a bisphenol with chlorobenzophenone in the optional presence of an alkaline hydroxide base and a soluble organic copper complex or a copper, platinum, or palladium salt. A high boiling solvent such as NMP may be used. The reaction may be performed at temperatures in excess of 160° C. to initially form the oligomeric aromatic ether-aromatic ketone terminated as a phenolate salt. The reaction may readily occur in high yield for the lower molecular weight oligomeric phthalonitriles. Further reaction of the phenolate salt with 4-nitrophthalonitrile affords the oligomeric aromatic ether-aromatic ketone phthalonitrile in high yields. Previously, the oligomeric phthalonitrile was synthesized with the more reactive and more costly fluorobenzophenone, which readily occurred at 150° C. in dipolar aprotic solvents. The present reaction may be performed at a higher temperature due to the lower reactivity of the chlorobenzophenone relative to fluorobenzophenone. In addition, the chlorobenzophenone is less expensive.

The oligomeric phthalonitriles typically have melting points or glass transition temperatures and exist as liquids between about 40° and 100° C. The curing mixture composed of a combination of metal salts and strong inorganic and/or strong organic acids affords the ability to partial cure (B-stage) phthalonitrile resins/monomers and perform gelation to a shaped solid at temperatures below 200° C., for which there are no known prior reports achieving this for the phthalonitrile resins/monomers. Being able to form the shaped solid below 200° C. may be important to users having curing autoclaves with temperature limitations below 200° C.

The methods disclosed herein are targeted towards developing high temperature and flame resistant polymers/composites and addressing processability of the phthalonitrile resins to a shaped solid at temperature below 250° C. To achieve this processability goal, more reactive curing agent(s) that more strongly interact with the cyano units of the phthalonitrile moieties and readily propagate the curing reaction are used. The time to gelation is controlled as a function or reactivity of the curing additive, amount of curing additive, and the temperature. At the gelled stage, the phthalonitrile is not fully cured but has been partially polymerized from the liquid phase to a shaped solid in the presence of the curing additives. The partially cured (B-stage) may be stable under ambient conditions without the need to store in a freezer. This is in contrast to epoxies and certain polyimides that have to be stored under freezer conditions to reduce the curing, which continues to slowly occur. The B-staged phthalonitrile may be stable indefinitely under ambient conditions and only continues to cure when heated above 150° C.

The gelled shaped solid can be further cured at higher temperatures to complete the cure or polymerization reaction and improve on the physical properties. In addition, the gelled shaped solids can be isolated and stored indefinitely under ambient conditions until ready to complete the cure at elevated temperatures. Highly aromatic phthalonitriles have not been previously converted to the gelled solid below 250° C. The phthalonitrile polymers, formed from the novel oligomeric phthalonitrile monomers, may exhibit outstanding flammability properties for ship, submarine, aerospace, and other domestic applications and may be able to withstand high temperatures (300-375° C.) in oxidative environments such as air. Other possible applications include, but are not limited to, composite ball valves and other pressure valves, bearings, engine components including the engine block of automobile, boats, etc., aerospace engine composite products, insulator tubes for submerged electrical rods, lightweight tubing for the oil industry, gaskets and seals, RF transparency for computers, radomes, and other electronic devices, flame resistant battery casings, sport equipment, textiles, coatings for high voltage cables, appliances, and aviation, marine, and electronic components.

The use of low molecular weight precursor resins to obtain thermosetting polymeric materials with high thermo-oxidative properties is often advantageous from a processing standpoint. Liquid precursor resins such as the low melting, liquid oligomeric phthalonitriles may be useful in composite fabrication by a variety of cost effective methods such as resin infusion molding (RIM), resin transfer molding (RTM), filament winding, and prepreg consolidation. Furthermore, resins with a large window between the melting point or liquid phase and the cure temperature are desirable to control the viscosity and the rate of curing for fabrication of shaped fiber reinforced composite composites by the cost effective methods. With the low melting or liquid phthalonitrile monomers disclosed herein, processability to shaped composite components may be achieved in autoclave and non-autoclave conditions below 200° C. and by the cost effective methods.

Oligomeric aromatic ether-aromatic ketone-containing phthalonitriles have been synthesized by a more cost effective method from a bisphenol and chlorobenzophenone in the presence of an alkaline hydroxide base, such as sodium hydroxide or potassium hydroxide, and an optional organic copper complex. Various amounts of, for example, bisphenol and chlorobenzenophenone are used with bisphenol always in excess to ensure termination of the oligomeric composition as the diphenolate (Eqs. (1)-(2)) (also referred to as a dimetallic salt of the dihydroxyaromatic compound). At this stage, the phenolate terminated composition can be end-capped by reaction with the 4-nitrophthalonitrile to afford the oligomeric phthalonitrile (Eqs. (3)-(4)). The equations below show a 2:1 ratio of hydroxy to chloro compounds, however other ratios, such as 3:2, 4:3, and 21:20 may be used. Lower molecular weight oligomers may be easier to synthesize by the presently disclosed methods. It should be noted that the reaction produces a mixture of oligomers. If the ratio is 2:1, the oligomers shown below will predominate, but some amount of oligomers having a 3:2 ratio and higher of the reactants are made, as well as some dimetallic salt of the original dihydroxyaromatic compound ($M^+O^-$—$Ar^1$—$O^-$ $M^+$) (diphenolate). Ratios between the adjacent integer ratios above, such as for example 2.5:1 or excesses of 5, 10, 20, 30, or 40 mol %, will produce a significant amount of the diphenolate salt of the dihydroxyaromatic compound. These salts also react with 4-nitrophthalonitrile to form phthalonitrile monomers that can cure to a thermoset with or without longer phthalonitrile monomers. They may help to reduce the viscosity of the monomer blend before it cures, while still producing suitable properties in the thermoset. The reduced viscosity may allow for formation of fibers, including textile fibers, from the monomer blend. The use of excess dihydroxyaromatic may also decrease the time required for high yields to, for example, 5-6 hr at 160-170° C.

(1)

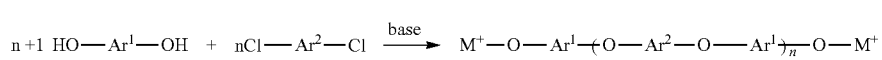

(2)

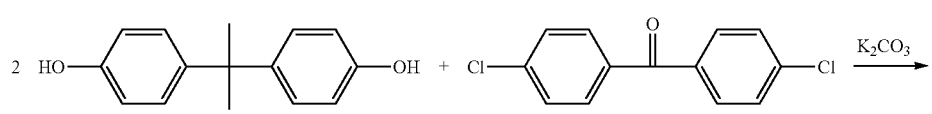

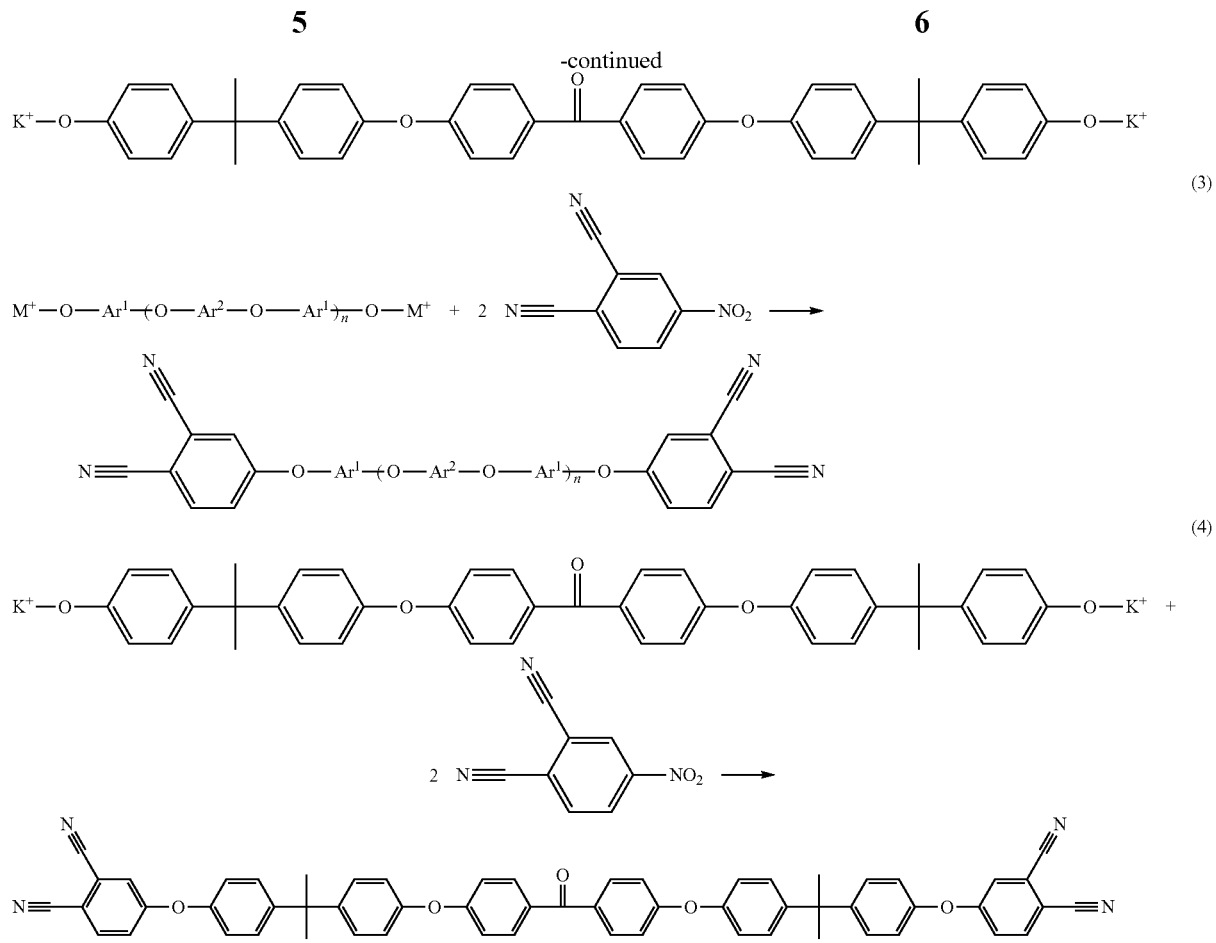

For example, if a 5 mol % excess over a 2:1 ratio of the dihydroxyaromatic compound is used, an approximately 1:20 ratio of the first and second compounds would be produced. The 10, 20, 30, and 40 mol % excess would produce ratios of approximately 1:10, 1:5:3:10, and 2:5, respectively. Some amount of phthalonitrile compounds of other spacer lengths may be produced. The first compound and the second compound together make up at least 50, 60, 70, 80, 90, or 95 mol % of all the phthalonitrile compounds in the composition. The first compound may make up at least 5, 10, 20, 30, 40, or 50 mol % of all the phthalonitrile compounds in the composition.

The synthesis of the oligomeric phthalonitrile using the chlorobenzophenone rather than fluorobenzophenone is an advanced synthetic method that is more cost effective and a superior commercialization method. The reaction of the chlorobenzophenone with a bisphenol (or any dihydroxyaromatic) in the presence of a base may not occur with the typical dipolar aprotic solvents (DMF or DMAC) but may be carried out at higher temperatures using a higher boiling solvent such as DMSO or NMP to convert to high yields (>95%) of the phenolate salt. End capping of the salt with 4-nitrophthalonitrile may be performed from ambient to 100° C. to afford quantitative yields of the oligomeric phthalonitrile.

Low melting oligomeric phthalonitriles may be cured to gelation or a shaped solid in the presence of various highly reactive curing additives below 250° C. (Eq. (5)). Various amounts of the curing additive mixture (including but not limited to 1-10 wt % or 2-5 wt %) relative to the phthalonitrile have been evaluated. The precursor composition (phthalonitrile monomer and curing additive) may be mixed under ambient conditions or may be added at any temperature in the melt state up to the decomposition temperature. The precursor composition can be heated to a B-staged mixture (liquid) in which some reaction has occurred but before gelation occurs. Further heating below 250° C. will result in the composition becoming rubbery before gelation to the shaped solid. At the gelation stage, the solid can retain its shape, be stored indefinitely under ambient condition, or be placed in a high temperature furnace/oven at temperatures up to 500° C. to fully cure to a polymer that does not exhibit a glass transition temperature ($T_g$) (Eq. (5)).

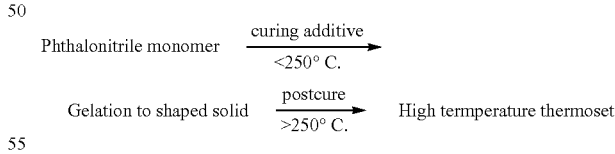

Any phthalonitrile monomer that exists in the liquid state below 250° C. can be cured to a shaped solid by the curing additives of this invention. With the curing additive composed of a combination of metal salt and strong inorganic and/or organic acid, such phthalonitriles include the simple bisphenol-based phthalonitriles of bisphenol A (bisphenol A phthalonitrile, m. p. 195-198° C.) and resorcinol (resorcinol phthalonitrile, m.p. 173-175° C.), the multiple aromatic ether oligomeric phthalonitriles, and the aromatic ether PEEK-like phthalonitriles. Strong acids that have been used to form the curing additive include sulfuric acid, sulfurous acid, phosphoric acid, p-toluene sulfonic acid, and naphthalenesulfonic acid. Transition metal salts are typically used as the metal source in the curing additive mixtures including the metal salts of Cu, Co, Fe, Sn, Zn, Ni, and Pd.

The new curing compositions/mixtures for the curing of the liquid or low melting phthalonitriles may afford the ability to convert to a shaped, partially cured solid at temperatures below 250° C. There are no known prior reports of gelation being achieved at these temperatures. When used alone, most of the reactive aromatic diamines [e.g. 1,3-bis(3-aminophenoxy)benzene; m-APB or 1,4-bis(4-aminophenoxy)benzene; p-APB] used as a curing additive must be added to the melt or liquid of the phthalonitrile at 250° C. for quick reaction due to the volatility of the amine curing additive (Sastri et al, "Phthalonitrile Cure Reaction with Aromatic Diamines" *J. Polym. Sci. A: Polym. Chem.* 36, 1885-1890 (1998)). The less reactive thermally stable diamine, bis[4-(4-aminophenoxy)phenyl]sulfone; p-BAPS] has been typically used to cure the phthalonitriles due to its non-volatility and thermal stability up to 450° C. Conversion of the phthalonitrile monomer to a crosslinked polymer with this curing agent was typically accomplished in two stages. The first step was the addition of the diamine curing agent to the monomer melt at 250-255° C. in air followed by quenching the reaction after 10-15 min to form a phthalonitrile prepolymer or B-staged resin. The second stage involved phthalonitrile polymer by heating the prepolymer under inert conditions or in air over an extended period of time above 250° C. Precursor compositions involving the phthalonitrile and the metal salts can be formulated under ambient conditions and heated to the required polymerization temperature without fear of volatility or the curing additive can be added directly to the liquid at the initial polymerization temperature. For example, when using the curing additive involving a combination of metal salt and strong acid, the oligomeric phthalonitriles and bisphenol-based phthalonitriles with melting points below 200° C. can be partially cured to a shaped solid from a precursor composition heated from ambient to the initial curing temperature below 200° C. or can be added directly to the phthalonitrile at the initial curing temperature. The partially cured phthalonitrile-based solids may exhibit a glass transition temperature usually below the initial curing temperature. Previously, the oligomeric and bisphenol-based phthalonitriles were cured in the presence of aromatic amines at or greater than 250° C. to achieve gelation in a timely manner. After gelation, the shaped solid can be stored indefinitely at room temperature without further reaction. The phthalonitrile-curing composition/mixture can be formulated at room temperature and stored indefinitely under ambient conditions. In addition, a prepolymer mixture (B-stage) can be produced at temperatures up to 250° C. and quenched before gelation and stored indefinitely under ambient conditions for usage such as coatings needing a high molecular weight prepolymer to achieve a continuous film and for other applications needing a fast cure to gelation. The B-staged mixture is soluble in common solvents. Phthalonitrile prepregs containing the curing composition can be stored indefinitely under ambient condition without the new for storage under freezer conditions, which is the case with other resin systems such as epoxy curing compositions. Heating can be longer at about 200° C. or with larger concentration of aromatic amines and cure at 200° C. In textile applications, the B-staged or prepolymer composition may slowly cure at as low as 150° C. By controlling the initial cure to the shaped solid below 200° C., existing autoclaves designed for epoxy technology can be used to fabricate composite components, which may be important in the automobile, ship, aerospace, electronics, and domestic industries.

Since the viscosity of the liquid polymerization system can be easily controlled as a function of temperature and the amount of curing additive, shaped solids and composite components can be fabricated by cost effective method such as resin transfer molding (RTM), resin infusion molding (RIM), filament winding, and prepreg consolidation and potentially by automated composite manufacturing techniques such as automated tape laying and automated fiber placement. The ability to cure to a shaped solid below 250° C. and the superior physical properties relative to other high temperature polymers such as polyimides enhances the importance of the phthalonitrile system. Due to the low water absorptivity, processability at a temperature comparable to epoxy resins, and the superior thermo-oxidative stability of fully cured phthalonitriles to temperatures in excess of 375° C., the phthalonitrile-based polymers have potential for a variety of applications not envisioned before including its use in the fabrication of advanced composites by conventional prepreg consolidation, RTM, injection molding, RIM, and filament winding. The oligomeric phthalonitrile-based polymers would be expected to exhibit improvements in specific physical properties, e.g., toughness and processability, relative to systems with a short spacer (bisphenol A phthalonitrile and resorcinol phthalonitrile) between the terminal phthalonitrile moieties.

In the first synthesis step, a solution that includes the dichloroaromatic compound, the dihydroxyaromatic compound, the organic transition metal complex or the transition metal salt, if used, the base, and the solvent is provided. All references to the dihydroxyaromatic compound and the dichloroaromatic compound include mixtures of more than one of such compounds for producing phthalonitriles that can incorporate more than one of the compounds. Statements of relative amounts of these compounds can refer to the entire amount of each type of compound. For the reaction to readily occur, the dichloroaromatic compound is activated by one or more electron withdrawing groups. The electron withdrawing group(s) are bound to each of the aromatic rings that has one of the chloride groups. If the two reacting chloride groups are on the same ring, they are not considered to be electronic withdrawing groups that activate each other, though a third chloride could perform this function. The compound may have a single electron withdrawing group that activates both chlorides, either in a single ring or bridging two rings. Benzophenone has an electron withdrawing carbonyl unit to activate the chloro units being displaced by the nucleophilic reaction of the dipotassium or disodium salt of the dihydroxy-terminated aromatic reactant. Other activators may also work to enhance the displacement of the chloro unit, such as sulfonyl (—S(=O)$_2$—), sulfinyl (—S(=O)—), phosphoryl (—P(=O)—), and multiple carbonyl or other units with the dichloroaromatic compound, to nucleophilic displacement. Other groups known in the art to be electron withdrawing groups may also be used. Dichlorobenzophenenones, including 4,4'-dichlorobenzophenenone, are suitable. Another suitable compound is bis(4-chlorophenyl)sulfoxide. Any dihydroxyaromatic compound may be used, including but not limited to, a bisphenol,2,2-bis(4-hydroxyphenyl)propane, 2,2-bis(4-hydroxyphenyl)-1,1,1,3,3,3-hexafluoropropane, or resorcinol may be used. Other suitable reactants are disclosed in U.S. Pat. Nos. 8,362,239; 8,222,403; 8,039,576; 7,511,113; 7,452,959; 6,891,014; 6,756,470; 6,297,298; 6,001,926; 5,965,268; 5,939,508; 5,925,475; 5,895,726; 5,464,926; 5,389,441; 5,352,760; 5,350,828; 5,304,625; 5,292,854; 5,262,514; 5,247,060; 5,237,045; 5,208,318; 5,202,414; 5,159,054; 5,132,396; 5,004,801; 5,003,078; 5,003,039; 4,619,986; 4,410,676; 4,409,382; 4,408,035; and 4,209,458. The dichloro- and dihydroxy-compounds also include trifunctional and higher such compounds. The reaction proceeds essentially the same way regardless of the dichloroaromatic and dihydroxyaromatic selected.

The organic transition metal complex may be in solution with the reactants, but this is not required. Transition metal salts may be only partially soluble at a given temperature, but may still be used in the reaction. Multiple such catalysts may be used to enhance the reaction conditions. Suitable transition metals include Cu, Zn, Fe, Co, Ni, Pd, and Pt. One suitable copper complex is bromotris(triphenylphosphine)copper(I) ($(PPh_3)_3CuBr$). Other suitable compounds may be found in the above cited patents as well as in U.S. Pat. Nos. 8,288,454; 7,897,715; 7,723,420; 7,511,113; 7,348,395; 7,342,085; 7,087,707; and 5,980,853. One suitable base is potassium carbonate. Other suitable bases may be found in the above cited patents.

Any solvent that dissolves the aromatic compounds and can be heated to a temperature that causes the reaction may be used. Higher boiling point solvents may be suitable as the chloro compounds are less reactive than the similar fluoro compounds. Suitable solvents include, but are not limited to, dimethylsulfoxide (DMSO), N,N-dimethylacetamide (DMAC), N-methylpyrrolidinone (NMP), and others disclosed in the above cited patents. DMSO may allow for higher reaction temperatures such as 170°, resulting faster reaction times, and in the absence of the copper catalyst. Lower boiling solvents such as DMAC and DMF may be suitable at lower temperatures when a copper catalyst is used.

The solution may be heated to, for example 130-150° C., 165° C., 170° C., 180° C., or higher, causing formation of the aromatic ether oligomer. The oligomer may be formed as a salt of the metal from the base, such as a potassium or sodium salt. Formation of the hydroxyl form may also occur in the presence of water. The initial addition of water dissolves the base and enhances with the bisphenol. The added water and water formed from the reaction of the aromatic compounds is distilled as the reaction progresses in order to move the reaction to completion. The use of high temperatures, along with the copper compound, can increases the reaction yield, which may be, for example, at least 90% or at least 95%. The yield may be higher than typically seen using the fluoro analogs of the chloro compounds. Bisphenols may generally have a higher yield than resorcinol.

In a second step, the aromatic ether oligomer or the mixture containing the aromatic ether oligomer and excess dimetallic bisphenol (short spacer) salt is reacted with 4-nitrophthalonitrile to form a phthalonitrile monomer. The presence of the short spacer phthalonitrile within the product mixture may act to reduce the viscosity and flow properties for processability into shaped polymers and composite components. The reaction generally occurs upon addition of the 4-nitrophthalonitrile and heating. Methods of performing this reaction are described below and in the above cited patents.

In a third step, the phthalonitrile monomer is cured to form a phthalonitrile thermoset. This may be done with the use of both an acid and a curing agent as a curing additive. The curing may occur in two steps. An initial cure to gelation at 250° C. or less or 200° C. or less, followed by a postcure at higher temperatures, such as up to 450° C., to form a fully cured thermoset. The initial cure may be performed in a mold so that the monomer may be converted to a melt and form an article having a desired shape. That shape can remain the same during the postcure.

Suitable acids for the curing additive include, but are not limited to, sulfuric acid, sulfurous acid, phosphoric acid, p-toluene sulfonic acid, naphthalenesulfonic acid, and trifluoromethanesulfonic acid. Other acids are disclosed in U.S. Pat. Nos. 5,247,060; 5,237,045; and others cited above. Metal salts may be used as the curing agent including but not limited to, copper (II) acetylacetonate, palladium (II) acetylacetonate, zinc (II) naphthenate, cobalt (II) acetylacetonate, nickel (II) acetylacetonate, iron (III) acetylacetonate, and tin (II) oxalate. Other suitable salts as well as organic or diamine curing agents are disclosed herein and in the above cited patents.

The curing may be performed using phthalonitrile compound, whether or not formed by the above synthesis procedure. Likewise, the aromatic ether oligomer or diphenolate salt thereof may be synthesized without subsequently synthesizing the phthalonitrile monomer or thermoset. The curing may be performed on a mixture of phthalonitriles, including the presence of a significant amount of the phthalonitrile made from the dihydroxyaromatic ($C_6H_3(CN)_2$—O—$Ar^1$—O—$C_6H_3(CN)_2$).

The following examples are given to illustrate specific applications. These specific examples are not intended to limit the scope of the disclosure in this application.

Example 1

Synthesis of 2:1 Oligomeric Hydroxyl Compound Based on Bisphenol-A and 4,4'-Dichlorobenzophenone Isolated as the Potassium Salt Using a Copper (I) Co-Catalyst To a 250 mL, three-necked flask fitted with a thermometer, a Dean-Stark trap with condenser, and a nitrogen inlet were added bisphenol A (15.0 g, 65.7 mmol), 4,4'-dichlorobenzophenone (8.21 g, 32.7 mmol), powdered anhydrous $K_2CO_3$ (13.5 g, 97.8 mmol), $(PPh_3)_3CuBr$ (50 mg), toluene (15 mL), and N-methylpyrrolidinone (NMP) (100 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 hr with very small amount of toluene present to control the temperature and to remove the total water formed as a by-product, so that the reaction could be pushed to completion and high conversion to the hydroxyl salt intermediate. The mixture was cooled and the sodium salt of the 2:1 oligomeric hydroxyl compound was left in solution to use in further reactions.

Example 2

Synthesis of 2:1 Oligomeric Phthalonitrile Based on Bisphenol-A and 4,4'-Dichlorobenzophenone in One Reaction Pot Using a Copper (I) Co-Catalyst To a 250 mL, three-necked flask fitted with a thermometer, a Dean-Stark trap with condenser, and a nitrogen inlet were added bisphenol A (15.0 g, 65.7 mmol), 4,4'-dichlorobenzophenone (8.21 g, 32.7 mmol), powdered anhydrous $K_2CO_3$ (13.5 g, 97.8 mmol), $(PPh_3)_3CuBr$ (50 mg), toluene (15 mL), and N-methylpyrrolidinone (NMP) (100 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 hr with a very small amount of toluene present to control the temperature and to totally remove the water formed as a by-product, so that the reaction could be pushed to completion and high conversion to the hydroxyl salt intermediate. The mixture was cooled to 50° C. At this time, 4-nitrophthalonitrile (11.7 g, 67.5 mmol) was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile (27.8 g, 95% yield). IR [cm$^{-1}$]: ν 3075 (C=CH), 2232 (CN), 1650 (C=O), 1587 (C=C), 1477 (aromatic), 1306 (aromatic), 1308 (C—O), 1245 (CH$_3$), 1160 (C—O), 929 (C—O), 845 (aromatic).

Example 3

Synthesis of 2:1 Oligomeric Hydroxyl Compound Based on Bisphenol-A6F and 4,4'-Dichlorobenzophenone Isolated as the Potassium Salt Using a Copper (I) Co-Catalyst To a 250 mL, three-necked flask fitted with a thermometer, a Dean-Stark trap with condenser, and a nitrogen inlet were added bisphenol A6F (15.0 g, 44.6 mmol), 4,4'-dichlorobenzophenone (5.60 g, 22.3 mmol), powdered anhydrous K$_2$CO$_3$ (9.24 g, 67.0 mmol), (PPh$_3$)$_3$CuBr (100 mg), toluene (15 mL), and dimethylsulfoxide (DMSO) (100 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 hr with a very small amount of toluene present to control the temperature and to remove the total water formed as a by-product, so that the reaction could be pushed to completion and high conversion to the hydroxyl salt intermediate. The mixture was cooled and the dipotassium salt of the 2:1 oligomeric hydroxyl compound was left in solution to use in further reactions.

Example 4

Synthesis of 2:1 Oligomeric Phthalonitrile Based on Bisphenol-A6F and 4,4'-Dichlorobenzophenone in One Reaction Pot Using a Copper (I) Co-Catalyst To a 250 mL, three-necked flask fitted with a thermometer, a Dean-Stark trap with condenser, and a nitrogen inlet were added bisphenol A6F (15.0 g, 44.6 mmol), 4,4'-dichlorobenzophenone (5.60 g, 22.3 mmol), powdered anhydrous K$_2$CO$_3$ (9.24 g, 67.0 mmol), (PPh$_3$)$_3$CuBr (100 mg), toluene (15 mL), and dimethylsulfoxide (DMSO) (100 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6-16 hr or until no more water was observed being collected in the Dean-Stark trap. The toluene was then slowly distilled and the mixture was cooled to 50° C. At this time, 4-nitrophthalonitrile (7.90 g, 45.6 mmol) was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile (23.8 g, 97% yield). IR [cm$^{-1}$]: ν3075 (C=CH), 2232 (CN), 1650 (C=O), 1587 (C=C), 1477 (aromatic), 1306 (aromatic), 1308 (C—O), 1245 (CH$_3$), 1160 (C—O), 929 (C—O), 845 (aromatic).

Example 5

Synthesis of 2:1 Oligomeric Hydroxyl Compound Based on Bisphenol-A6F (30% Excess) and 4,4'-Dichlorobenzophenone Isolated as the Potassium Salt Using a Copper (I) Co-Catalyst To a 2000 mL, three-necked flask fitted with a thermometer, a Dean-Stark trap with condenser, and a nitrogen inlet were added bisphenol-A6F (100 g, 298 mmol), 4,4'-dichlorobenzophenone (26.5 g, 106 mmol), powdered anhydrous K$_2$CO$_3$ (61.6 g, 446 mmol), (PPh$_3$)$_3$CuBr (250 mg), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 8-16 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled and the dipotassium salt of the 2:1 oligomeric hydroxyl compound with a 30% excess of bisphenol-A6F (present as dipotassium salt) was left in solution to use in further reactions.

Example 6

Synthesis of 2:1 Oligomeric Phthalonitrile Based on Bisphenol-A6F (30% Excess) and 4,4'-Dichlorobenzophenone in One Reaction Pot Using a Copper (I) Co-Catalyst To a 2000 mL, three-necked flask fitted with a thermometer, a Dean-Stark trap with condenser, and a nitrogen inlet were added bisphenol-A6F (100 g, 298 mmol), 4,4'-dichlorobenzophenone (26.5 g, 106 mmol), powdered anhydrous K$_2$CO$_3$ (61.6 g, 446 mmol), (PPh$_3$)$_3$CuBr (250 mg), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 8-16 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (69.4 g, 401 mmol) was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the product mixture of 2:1 oligomeric phthalonitrile and bisphenol-A6F phthalonitrile (159 g, 95% yield). IR [cm$^{-1}$]: ν 3074 (C=CH), 2232 (CN), 1652 (C=O), 1587 (C=C), 1476 (aromatic), 1306 (aromatic), 1308 (C—O), 1245 (CH$_3$), 1160 (C—O), 929 (C—O), 842 (aromatic).

Example 7

Synthesis of 2:1 Oligomeric Phthalonitrile Based on Bisphenol-A (30% Excess) and 4,4'-Dichlorobenzophenone in One Reaction Pot Using a Copper (I) Co-Catalyst To a 2000 mL, three-necked flask fitted with a thermometer, a Dean-Stark trap with condenser, and a nitrogen inlet were added bisphenol-A (100 g, 438 mmol), 4,4'-dichlorobenzophenone (38.5 g, 153 mmol), powdered anhydrous K$_2$CO$_3$ (90.0 g, 632 mmol), (PPh$_3$)$_3$CuBr (250 mg), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 hr with a very small amount of toluene present to control the temperature and to totally remove the water formed as a by-product, so that the reaction could be pushed to completion and high conversion to the hydroxyl salt intermediate. The mixture was cooled to 50° C. At this time, 4-nitrophthalonitrile (99.1 g, 573 mmol) was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the product mixture of 2:1 oligomeric phthalonitrile and bisphenol-A phthalonitrile (192 g, 97% yield). IR [cm$^{-1}$]: ν 3077 (C=CH), 2232 (CN), 1586 (C=C), 1478 (aromatic), 1306 (aromatic), 1308 (C—O), 1245 (CH$_3$), 1162 (C—O), 929 (C—O), 847 (aromatic).

Example 8

Synthesis of 2:1 Oligomeric Phthalonitrile Based on Resorcinol (30% Excess) and 4,4'-Dichlorobenzophenone in One Reaction Pot Using a Copper (I) Co-Catalyst To a 2000 mL, three-necked flask fitted with a thermometer, a Dean-Stark trap with condenser, and a nitrogen inlet were added resorcinol (26.0 g, 236 mmol), 4,4'-dichlorobenzophenone (22.8 g, 90.7 mmol), powdered anhydrous K$_2$CO$_3$ (48.9 g, 354 mmol), (PPh$_3$)$_3$CuBr (150 mg), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 hr or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 hr with a very small amount of toluene present to control the temperature and to totally remove the water formed as a by-product, so that the reaction could be pushed to completion and high conversion to the hydroxyl salt intermediate. The mixture was cooled to 50° C. At this time, 4-nitrophthalonitrile (52.7 g, 304 mmol) was added in one portion and the reaction mixture was heated at 80° C. for 6-8 hr. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the product mixture of 2:1 oligomeric phthalonitrile and resorcinol phthalonitrile (70.6 g, 90% yield). IR [cm$^{-1}$]: ν 3072 (C=CH), 2234 (CN), 1586 (C=C), 1478 (aromatic), 1307 (aromatic), 1308 (C—O), 1245 (CH$_3$), 1162 (C—O), 930 (C—O), 847 (aromatic).

Example 9

Curing of 2:1 Oligomeric Phthalonitrile Based on Bisphenol-A and 4,4'-Dichlorobenzophenone with an Aromatic Sulfonic Acid (10 Wt %) and Copper (II) Acetylacetonate (10 Wt %) Cured at 190° C.

The 2:1 oligomeric phthalonitrile from Example 2 (500 mg), p-toluenesulfonic acid (50 mg), and copper (II) acetylacetonate (50 mg) were stirred at 175° C. for 2 minutes, whereby the mixture darkened and began to turn green. The mixture was placed in a furnace and cured under air by heating at 190° C. for 16 hr (overnight) to afford a polymer; gelation to a shaped solid occurred after 1 hr. At this point the polymer exhibited a glass transition (T$_g$) at around 165° C. Upon post-curing to above 375° C., the polymer no longer exhibited a T$_g$. The polymer exhibited excellent thermal and oxidative stability up to 450° C. before any weight loss was detected as determined by a thermogravimetric analysis (TGA). Catastrophic decomposition occurred after 500° C. in air.

Example 10

Curing of 2:1 Oligomeric Phthalonitrile Based on Bisphenol-A and 4,4'-Dichlorobenzophenone with an Aromatic Sulfonic Acid (2 Wt %) and Copper (II) Acetylacetonate (5 Wt %) Cured at 200° C.

The 2:1 oligomeric phthalonitrile from Example 2 (1000 mg), p-toluenesulfonic acid (20 mg), and copper (II) acetylacetonate (50 mg) were stirred at 190° C. for 2 minutes, whereby the mixture darkened and began to turn green. The mixture was placed in a furnace and cured under air by heating at 200° C. for 16 hr (overnight) to afford a polymer; gelation to a shaped solid occurred after 0.5 hr. At this point, the polymer exhibited a $T_g$ at around 170° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 11

Curing of 2:1 Oligomeric Phthalonitrile Based on Bisphenol-A and 4,4'-Dichlorobenzophenone with an Aromatic Sulfonic Acid (1 Wt %) and Copper (II) Acetylacetonate (2.5 Wt %) Cured at 200° C.

The 2:1 oligomeric phthalonitrile from Example 2 (1000 mg), p-toluenesulfonic acid (10 mg), and copper (II) acetylacetonate (25 mg) were stirred at 190° C. for 2 minutes, whereby the mixture darkened and began to turn green. The mixture was placed in a furnace and cured under air by heating at 200° C. for 16 hr (overnight) to afford a polymer; gelation to a shaped solid occurred after 4 hr. At this point, the polymer exhibited a $T_g$ at around 160° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 12

Curing of 2:1 Oligomeric Phthalonitrile Based on Bisphenol-A and 4,4'-Dichlorobenzophenone with an Aromatic Sulfonic Acid (2 Wt %) and Copper (II) Acetylacetonate (5 wt %) Cured at 175° C.

The 2:1 oligomeric phthalonitrile from Example 2 (1000 mg), p-toluenesulfonic acid (20 mg), and copper (II) acetylacetonate (50 mg) were stirred at 175° C. for 2 minutes, whereby the mixture darkened and began to turn green. The mixture was placed in a furnace and cured under air by heating at 175° C. for 16 hr (overnight) to afford a polymer; gelation to a shaped solid occurred after 6 hr. At this point, the polymer exhibited a $T_g$ at around 126° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 13

Curing of 2:1 Oligomeric Phthalonitrile Based on Bisphenol-A and 4,4'-Dichlorobenzophenone with an Aromatic Sulfonic Acid (2 Wt %) and Palladium (II) Acetylacetonate (5 Wt %) Cured at 250° C.

The 2:1 oligomeric phthalonitrile from Example 2 (553 mg), p-toluenesulfonic acid (11 mg), and palladium (II) acetylacetonate (28 mg) were stirred at 175° C. for 2 minutes, whereby the mixture darkened and began to turn green. The mixture was placed in a furnace and cured under air by heating at 250° C. for 16 hr (overnight) to afford a polymer; gelation to a shaped solid occurred after 15 min. At this point, the polymer exhibited a $T_g$ at around 220° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 14

Curing of 2:1 Oligomeric Phthalonitrile Based on Bisphenol-A and 4,4'-Dichlorobenzophenone with an Aromatic Sulfonic Acid (2 Wt %) and Zinc (II) Napthenate (4 wt %) Cured at 200° C.

The 2:1 oligomeric phthalonitrile from Example 2 (591 mg), p-toluenesulfonic acid (13 mg), and zinc (II) naphthenate (23 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 3 hr. At this point, the polymer exhibited a $T_g$ at around 150° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 15

Curing of 2:1 Oligomeric Phthalonitrile Based on Bisphenol-A and 4,4'-Dichlorobenzophenone with an Aromatic Sulfonic Acid (2 Wt %) and Cobalt (II) Acetylacetonate (5 wt %) Cured at 200° C.

The 2:1 oligomeric phthalonitrile from Example 2 (623 mg), p-toluenesulfonic acid (12 mg), and cobalt (II) acetylacetonate (31 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 0.5 hr. At this point, the polymer exhibited a $T_g$ at around 155° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 16

Curing of 2:1 Oligomeric Phthalonitrile Based on Bisphenol-A and 4,4'-Dichlorobenzophenone with an Aromatic Sulfonic Acid (2 Wt %) and Nickel (II) Acetylacetonate (5 wt %) Cured at 200° C.

The 2:1 oligomeric phthalonitrile from Example 2 (650 mg), p-toluenesulfonic acid (13 mg), and nickel (II) acetylacetonate (33 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 1 hr. At this point, the polymer exhibited a $T_g$ at around 165° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 17

Curing of 2:1 Oligomeric Phthalonitrile Based on Bisphenol-A and 4,4'-Dichlorobenzophenone with an Aromatic Sulfonic Acid (2 Wt %) and Iron (III) Acetylacetonate (5 wt %) Cured at 225° C.

The 2:1 oligomeric phthalonitrile from Example 2 (703 mg), p-toluenesulfonic acid (14 mg), and iron (III) acetylacetonate (35 mg) were stirred at 175° C. for 2 minutes, whereby the mixture darkened and began to turn green. The mixture was placed in a furnace and cured under air by heating at 225° C. for 16 hr (overnight) to afford a polymer; gelation to a shaped solid occurred after 0.5 hr. At this point, the polymer exhibited a $T_g$ at around 200° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 18

Curing of 2:1 Oligomeric Phthalonitrile Based on Bisphenol-A and 4,4'-Dichlorobenzophenone with an Aromatic Sulfonic Acid (2 Wt %) and Tin (II) Oxalate (5 Wt %) Cured at 200° C.

The 2:1 oligomeric phthalonitrile from Example 2 (656 mg), p-toluenesulfonic acid (13 mg), and tin (II) oxalate (33 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 3 hr. At this point, the polymer exhibited a $T_g$ at around 160° C. Upon post-curing to above 375° C., the polymer no longer exhibited a $T_g$. The polymers exhibited excellent thermal and oxidative stability up to 450° C. before any weight loss was detected as determined by TGA. Catastrophic decomposition occurred after 500° C. in air.

Example 19

Curing of 2:1 Oligomeric Phthalonitrile Based on Bisphenol-A and 4,4'-Dichlorobenzophenone with Concentrated Sulfuric Acid (2 Wt %) and Copper (II) Acetylacetonate (5 Wt %) Cured at 200° C.

The 2:1 oligomeric phthalonitrile from Example 2 (500 mg), sulfuric acid (10 mg), and copper (II) acetylacetonate (25 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 1 hr. At this point, the polymer exhibited a $T_g$ at around 175° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 20

Curing of 2:1 Oligomeric Phthalonitrile Based on Bisphenol A6F and 4,4'-Dichlorobenzophenone with Concentrated Sulfuric Acid (2 Wt %) and Copper (II) Acetylacetonate (5 wt %) Cured at 150° C.

The 2:1 oligomeric phthalonitrile from Example 4 (230 mg), sulfuric acid (5 mg), and copper (II) acetylacetonate (12 mg) were stirred at 150° C. for 2 minutes, whereby the mixture darkened and turned red. The mixture was placed in a furnace and cured under air by heating at 150° C. for 16 hr (overnight) to afford a polymer; gelation to a shaped solid occurred after 5 hr. At this point, the polymer exhibited a $T_g$ at around 95° C. Upon post-curing to above 375° C., the polymer no longer exhibited a $T_g$. The polymers exhibited excellent thermal and oxidative stability up to 450° C. before any weight loss was detected as determined by TGA. Catastrophic decomposition occurred after 500° C. in air.

Example 21

Curing of Resorcinol Phthalonitrile with an Aromatic Sulfonic Acid (2 Wt %) and Copper (II) Acetylacetonate (5 Wt %) Cured at 200° C.

Resorcinol phthalonitrile (723 mg), p-toluenesulfonic acid (15 mg), and copper (II) acetylacetonate (39 mg) were stirred at 200° C. for 2 minutes, whereby the mixture darkened and began to turn green. The mixture was placed in a furnace and cured under air by heating at 200° C. for 16 hr (overnight) to afford a polymer; gelation to a shaped solid occurred after 2 hr. At this point, the polymer exhibited a $T_g$ at around 150° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 22

Curing of 2:1 Oligomeric Phthalonitrile Based on Bisphenol-A and 1,3-Dibromobenzene with Concentrated Sulfuric Acid (1 Wt %) and Copper (II) Acetylacetonate (2.5 wt %) Cured at 200° C.

A 2:1 oligomeric phthalonitrile (2010 mg), prepared from the reaction of bisphenol-A and 1,3-dibromobenzene under modified Ullmann conditions followed by end capping with 4-nitrophthalonitrile, sulfuric acid (20 mg), and copper (II) acetylacetonate (50 mg) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 3 hr. At this point, the polymer exhibited a $T_g$ at around 158° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 23

Curing of 2:1 Oligomeric Phthalonitrile Based on Bisphenol-A and 4,4'-Dichlorobenzophenone with Concentrated Sulfuric Acid (2 Wt %) and Cobalt (II) Acetylacetonate (5 wt %) Cured at 200° C.

The 2:1 oligomeric phthalonitrile from Example 2 (537 mg), sulfuric acid (11 mg), and cobalt (II) acetylacetonate (27 mg) were stirred at 150° C. for 2 minutes, whereby the mixture darkened and began to turn green. The mixture was placed in a furnace and cured under air by heating at 200° C. for 16 hr (overnight) to afford a polymer; gelation to a shaped solid occurred after 0.5 hr. At this point, the polymer exhibited a $T_g$ at around 145° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 24

Curing of 2:1 Oligomeric Phthalonitrile Based on Bisphenol-A and 4,4'-Dichlorobenzophenone with Trifluoromethanesulfonic Acid (2 Wt %) and Copper (II) Acetylacetonate (5 Wt %) Cured at 200° C.

The 2:1 oligomeric phthalonitrile from Example 2 (523 mg), trifluoromethanesulfonic acid (11 mg), and copper (II) acetylacetonate (26 mg) were stirred at 150° C. for 2 minutes, whereby the mixture darkened and began to turn green. The mixture was placed in a furnace and cured under air by heating at 200° C. for 16 hr (overnight) to afford a polymer; gelation to a shaped solid occurred after 1 hr. At this point, the polymer exhibited a $T_g$ at around 152° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 25

Curing of 2:1 Oligomeric Phthalonitrile Based on Bisphenol-A and 4,4'-Dichlorobenzophenone with Trifluoromethanesulfonic Acid (2 Wt %) and Cobalt (II) Acetylacetonate (5 wt %) cured at 200° C.

The 2:1 oligomeric phthalonitrile from Example 2 (659 mg), trifluoromethanesulfonic acid (13 mg), and cobalt (II) acetylacetonate (33 mg) were stirred at 150° C. for 2 minutes, whereby the mixture darkened and began to turn green. The mixture was placed in a furnace and cured under air by heating at 200° C. for 16 hr (overnight) to afford a polymer; gelation to a shaped solid occurred after 15 min. At this point, the polymer exhibited a $T_g$ at around 137° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 26

Curing of Oligomeric Phthalonitrile Based on Resorcinol and 1,3-Dibromobenzene with Trifluoromethanesulfonic Acid (2 Wt %) and Cobalt (II) Acetylacetonate (5 Wt %) Cured at 200° C.

An oligomeric phthalonitrile (1615 mg), prepared from the reaction of 2 moles of resorcinol and 1 mole of 1,3-dibromobenzene under modified Ullmann conditions followed by end capping of the intermediate salt with 4-nitrophthalonitrile, trifluoromethanesulfonic acid (13 mg), and cobalt (II) acetylacetonate (33 mg) were stirred at 150° C. for 2 minutes, whereby the mixture darkened and began to turn green. The mixture was placed in a furnace and cured under air by heating at 200° C. for 16 hr (overnight) to afford a polymer; gelation to a shaped solid occurred after 1 hr. At this point, the polymer exhibited a $T_g$ at around 155° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 27

Curing of 2:1 Oligomeric Phthalonitrile Based on Bisphenol-A and Bis(4-Fluorophenyl)Phenylphosphine Oxide with an Aromatic Sulfonic Acid (2 Wt %) and Copper (II) Acetylacetonate (5 Wt %) Cured at 200° C.

A 2:1 oligomeric phthalonitrile (500 mg), prepared from the reaction of 2 moles of bisphenol-A and 1 mole of bis(4-fluorophenyl)phenylphosphine oxide in the presence of a base and dipolar aprotic solvent and end capping with 4-nitrophthalonitrile, p-toluenesulfonic acid (10 mg), and copper (II) acetylacetonate (25 mg) were stirred at 190° C. for 2 minutes, whereby the mixture darkened and began to turn green. The mixture was placed in a furnace and cured under air by heating at 200° C. for 16 hr (overnight) to afford a polymer; gelation to a shaped solid occurred after 2 hr. At this point, the polymer exhibited a $T_g$ at around 165° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 28

Curing of 2:1 Oligomeric Phthalonitrile Based on Resorcinol and Bis(4-Fluorophenyl)Phenylphosphine Oxide with an Aromatic Sulfonic Acid (2 Wt %) and Cobalt (II) Acetylacetonate (5 wt %) Cured at 200° C.

A 2:1 oligomeric phthalonitrile (459 mg), prepared from the reaction of 2 moles of resorcinol and 1 mole of bis(4-fluorophenyl)phenylphosphine oxide in the presence of a base and dipolar aprotic solvent and end capping with 4-nitrophthalonitrile, p-toluenesulfonic acid (9 mg), and cobalt (II) acetylacetonate (23 mg) were stirred at 190° C. for 2 minutes, whereby the mixture darkened and began to turn green. The mixture was placed in a furnace and cured under air by heating at 200° C. for 16 hr (overnight) to afford a polymer; gelation to a shaped solid occurred after 2 hr. At this point, the polymer exhibited a $T_g$ at around 145° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 29

Curing of 2:1 Oligomeric Phthalonitrile Based on Resorcinol and 4,4'-Dibromodiphenylacetylene with an Aromatic Sulfonic Acid (2 Wt %) and Copper (II) acetylacetonate (5 wt %) cured at 200° C.

A 2:1 oligomeric phthalonitrile (506 mg), prepared from reaction of 2 moles of resorcinol and 1 mole of 4,4'-dibromodiphenylacetylene under modified Ullmann conditions followed by end capping of the intermediate salt with 4-nitrophthalonitrile, p-toluenesulfonic acid (10 mg), and copper (II) acetylacetonate (25 mg) were stirred at 190° C. for 2 minutes, whereby the mixture darkened and began to turn green. The mixture was placed in a furnace and cured under air by heating at 200° C. for 16 hr (overnight) to afford a polymer; gelation to a shaped solid occurred after 3 hr. At this point, the polymer exhibited a $T_g$ at around 155° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 30

Curing of 2:1 Oligomeric Heteroaromatic Phthalonitrile Based on 1,3-Dihydroxypyrimidine and 1,3'-Dibromobenzene with an Aromatic Sulfonic Acid (2 Wt %) and Copper (II) Acetylacetonate (5 Wt %) Cured at 225° C.

A 2:1 oligomeric phthalonitrile (500 mg), prepared from the reaction of 2 moles of 1,3-dihydroxypyrimidine and 1 mole of 1,3'-dibromobenzene under modified Ullmann conditions followed by end capping of the intermediate salt with 4-nitrophthalonitrile, p-toluenesulfonic acid (10 mg), and copper (II) acetylacetonate (25 mg) were stirred at 180° C. for 2 minutes, whereby the mixture darkened and began to turn green. The mixture was placed in a furnace and cured under air by heating at 225° C. for 16 hr (overnight) to afford a polymer; gelation to a shaped solid occurred after 2 hr. At this point, the polymer exhibited a $T_g$ at around 190° C. Upon post-curing to above 375° C., the polymer no longer exhibited a $T_g$. The polymer exhibited excellent thermal and oxidative stability up to 450° C. before any weight loss was detected by TGA. Catastrophic decomposition occurred after 500° C. in air.

Example 31

Curing of 2:1 Oligomeric Heteroaromatic Phthalonitrile Based on Bisphenol-A and 2,5-Dibromothiophene with an Sulfuric Acid (2 Wt %) and Copper (II) Acetylacetonate (5 Wt %) Cured at 200° C.

A 2:1 oligomeric phthalonitrile (500 mg), prepared from reaction of 2 moles of bisphenol A and 1 mole of 2,5-dibromothiophene under modified Ullmann conditions followed by end capping of the intermediate salt with 4-nitrophthalonitrile, sulfuric acid (10 mg), and copper (II) acetylacetonate (25 mg) were stirred at 200° C. for 2 minutes, whereby the mixture darkened and began to turn green. The mixture was placed in a furnace and cured under air by heating at 200° C. for 16 hr (overnight) to afford a polymer; gelation to a shaped solid occurred after 3 hr. At this point, the polymer exhibited a $T_g$ at around 165° C. Upon post-curing to above 375° C., the polymer no longer exhibited a $T_g$. The polymer exhibited excellent thermal and oxidative stability up to 450° C. before any weight loss was detected by TGA. Catastrophic decomposition occurred after 500° C. in air.

Example 32

Curing of 2:1 Oligomeric Phthalonitrile Based on Bisphenol-A and 4,4'-Dichlorobenzophenone Containing a 30% Excess of Bisphenol a with an Sulfuric Acid (2 Wt %) and Copper (II) Acetylacetonate (5 Wt %) Cured at 200° C.

The 2:1 oligomeric phthalonitrile from Example 7 (25.0 g), sulfuric acid (500 mg), and copper (II) acetylacetonate (1.25 g) were stirred at 175° C. for 2 minutes, whereby the mixture darkened and began to turn green. The mixture was placed in a furnace and cured under air by heating at 200° C. for 16 hr (overnight) to afford a polymer; gelation to a shaped solid occurred after 1 hr. At this point the polymer exhibited a glass transition ($T_g$) at around 165° C. Upon post-curing to above 375° C., the polymer no longer exhibited a $T_g$. The polymer exhibited excellent thermal and oxidative stability up to 450° C. before any weight loss was detected as determined by TGA. Catastrophic decomposition occurred after 500° C. in air.

Example 33

Synthesis of 2:1 Oligomeric Hydroxyl Compound Based on Bisphenol-A6F (30% Excess) and 4,4'-Dichlorobenzophenone Isolated as the Potassium Salt To a 2000 mL, three-necked flask fitted with a thermometer, a Dean-Stark trap with condenser, and a nitrogen inlet were added bisphenol-A6F (100 g, 298 mmol), 4,4'-dichlorobenzophenone (26.5 g, 106 mmol), powdered anhydrous $K_2CO_3$ (61.6 g, 446 mmol), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 170-175° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled and the potassium salt of the 2:1 oligomeric hydroxyl compound with a 30% excess of bisphenol-A6F was left in solution to use in further reactions.

Example 33

Synthesis of 2:1 Oligomeric Phthalonitrile Based on Bisphenol-A6F (30% Excess) and 4,4'-Dichlorobenzophenone in One Reaction Pot To a 2000 mL, three-necked flask fitted with a thermometer, a Dean-Stark trap with condenser, and a nitrogen inlet were added bisphenol-A6F (100 g, 298 mmol), 4,4'-dichlorobenzophenone (26.5 g, 106 mmol), powdered anhydrous $K_2CO_3$ (61.6 g, 446 mmol), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 170-175° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (69.4 g, 401 mmol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile (159 g, 95% yield). IR [cm$^{-1}$]: ν 3074 (C=CH), 2232 (CN), 1652 (C=O), 1587 (C=C), 1476 (aromatic), 1306 (aromatic), 1308 (C—O), 1245 (CH$_3$), 1160 (C—O), 929 (C—O), 842 (aromatic).

Example 34

Synthesis of 2:1 Oligomeric Phthalonitrile Based on Bisphenol-A (30% Excess) and 4,4'-Dichlorobenzophenone in One Reaction Pot To a 2000 mL, three-necked flask fitted with a thermometer, a Dean-Stark trap with condenser, and a nitrogen inlet were added bisphenol-A (100 g, 438 mmol), 4,4'-dichlorobenzophenone (38.5 g, 153 mmol), powdered anhydrous K$_2$CO$_3$ (90.0 g, 632 mmol), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 170-180° C. under a nitrogen atmosphere for 6 h or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 h with a very small amount of toluene present to control the temperature, to totally remove the water, formed as a by-product, so that the reaction could be pushed to completion and high conversion to the hydroxyl salt intermediate. The mixture was cooled to 50° C. At this time, 4-nitrophthalonitrile (99.1 g, 573 mmol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile (192 g, 97% yield). IR [cm$^{-1}$]: ν 3077 (C=CH), 2232 (CN), 1586 (C=C), 1478 (aromatic), 1306 (aromatic), 1308 (C—O), 1245 (CH$_3$), 1162 (C—O), 929 (C—O), 847 (aromatic).

Example 35

Synthesis of 2:1 Oligomeric Phthalonitrile Based on Resorcinol (30% Excess) and 4,4'-Dichlorobenzophenone in One Reaction Pot To a 2000 mL, three-necked flask fitted with a thermometer, a Dean-Stark trap with condenser, and a nitrogen inlet were added resorcinol (26.0 g, 236 mmol), 4,4'-dichlorobenzophenone (22.8 g, 90.7 mmol), powdered anhydrous K$_2$CO$_3$ (48.9 g, 354 mmol), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 170-180° C. under a nitrogen atmosphere for 6 h or until no more water was observed being collected in the Dean-Stark trap. The toluene was then slowly distilled off causing the temperature to rise in the reaction vessel to enhance the yield of the intermediate hydroxyl salt and high conversion to this intermediate. The reaction mixture was heated above 180° C. for an additional 12 h with a very small amount of toluene present to control the temperature, to totally remove the water, formed as a by-product, so that the reaction could be pushed to completion and high conversion to the hydroxyl salt intermediate. The mixture was cooled to 50° C. At this time, 4-nitrophthalonitrile (52.7 g, 304 mmol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile (70.6 g, 90% yield). IR [cm$^{-1}$]: ν 3072 (C=CH), 2234 (CN), 1586 (C=C), 1478 (aromatic), 1307 (aromatic), 1308 (C—O), 1245 (CH$_3$), 1162 (C—O), 930 (C—O), 847 (aromatic).

Example 36

Synthesis of 2:1 Oligomeric Hydroxyl Compound Based on Bisphenol A6F (41% Excess) and 4,4'-Dichlorobenzophenone Isolated as the Potassium Salt Using KOH To a 1000 mL, three-necked flask fitted with a thermometer, a Dean-Stark trap with condenser, and a nitrogen inlet were added bisphenol A6F (100 g, 0.298 mol), 4,4'-dichlorobenzophenone (26.5 g, 0.106 mol), potassium hydroxide (36.7 g, 0.656 mol), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled and the potassium salts of the 2:1 oligomeric hydroxyl compound and the excess of bisphenol A6F were left in solution to use in further reactions.

Example 37

Synthesis of 2:1 Oligomeric Phthalonitrile Based on Bisphenol A6F (41% Excess) and 4,4'-Dichlorobenzophenone in One Reaction Pot Using KOH To a 2000 mL, three-necked flask fitted with a thermometer, a Dean-Stark trap with condenser, and a nitrogen inlet were added bisphenol A6F (100 g, 0.298 mol), 4,4'-dichlorobenzophenone (26.5 g, 0.106 mol), potassium hydroxide (36.7 g, 0.656 mol), toluene (15 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (69.4 g, 0.401 mol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile and the bisphenol A6F phthalonitrile composition (159 g, 95% yield). IR [cm$^{-1}$]: ν 3074 (C=CH), 2232 (CN), 1652 (C=O), 1587 (C=C), 1476 (aromatic), 1306 (aromatic), 1308 (C—O), 1245 (CH$_3$), 1160 (C—O), 929 (C—O), 842 (aromatic).

Example 38

Synthesis of 2:1 Oligomeric Phthalonitrile Based on Bisphenol a (43% Excess) and 4,4'-Dichlorobenzophenone in One Reaction Pot Using NaOH To a 2000 mL, three-necked flask fitted with a thermometer, a Dean-Stark trap with condenser, and a nitrogen inlet were added bisphenol A (100 g, 0.438 mol), 4,4'-dichlorobenzophenone (38.5 g, 0.153 mol), sodium hydroxide (38.5 g, 0.964 mol), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (99.1 g, 0.573 mol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile and the bisphenol A phthalonitrile composition (192 g, 97% yield). IR [cm$^{-1}$]: ν 3077 (C=CH), 2232 (CN), 1586 (C=C), 1478 (aromatic), 1306 (aromatic), 1308 (C—O), 1245 (CH$_3$), 1162 (C—O), 929 (C—O), 847 (aromatic).

Example 40

Synthesis of 2:1 Oligomeric Phthalonitrile Based on Resorcinol (30% Excess) and 4,4'-Dichlorobenzophenone in One Reaction Pot Using NaOH To a 2000 mL, three-necked flask fitted with a thermometer, a Dean-Stark trap with condenser, and a nitrogen inlet were added resorcinol (26.0 g, 0.236 mol), 4,4'-dichlorobenzophenone (22.8 g, 0.0907 mol), sodium hydroxide (20.8 g, 0.520 mol), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (52.7 g, 0.304 mol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile and the resorcinol phthalonitrile composition (70.6 g, 90% yield). IR [cm$^{-1}$]: ν 3072 (C=CH), 2234 (CN), 1586 (C=C), 1478 (aromatic), 1307 (aromatic), 1308 (C—O), 1245 (CH$_3$), 1162 (C—O), 930 (C—O), 847 (aromatic).

Example 41

Synthesis of 2:1 Oligomeric Phthalonitrile Based on Bisphenol a (43% Excess) and 4,4'-Dichlorobenzophenone in One Reaction Pot Using NaOH and Forming the Bisphenol a Phenolate Before 4,4'-Dichlorobenzophenone Addition To a 2000 mL, three-necked flask fitted with a thermometer, a Dean-Stark trap with condenser, and a nitrogen inlet were added bisphenol A (100 g, 0.438 mol), sodium hydroxide (38.5 g, 0.964 mol), toluene (25 mL), and dimethylsulfoxide (DMSO) (500 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 135-145° C. under a nitrogen atmosphere for 6 to 18 h or until no more water was observed being collected in the Dean-Stark trap. At this time, the reaction mixture was cooled to 20° C. and 4,4'-dichlorobenzophenone (38.5 g, 0.153 mol) was added and the mixture refluxed until NMR or FTIR indicated that all of the 4,4'-dichlorobenzophenone was consumed. The toluene was then slowly distilled off causing the temperature to rise to 180° C. in the reaction vessel to enhance the yield of the intermediate hydroxyl salt and high conversion to this intermediate. The mixture was cooled to 50° C. At this time, 4-nitrophthalonitrile (99.1 g, 0.573 mol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile and the bisphenol A phthalonitrile composition (192 g, 97% yield). IR [cm$^{-1}$]: ν 3077 (C═CH), 2232 (CN), 1586 (C═C), 1478 (aromatic), 1306 (aromatic), 1308 (C—O), 1245 (CH$_3$), 1162 (C—O), 929 (C—O), 847 (aromatic).

Example 42

Synthesis of 2:1 Oligomeric Hydroxyl Compound Based on Bisphenol-A (43% Excess) and Bis(4-Chlorophenyl) Sulfone Isolated as the Sodium Salt Using NaOH To a 500 mL, three-necked flask fitted with a thermometer, a Dean-Stark trap with condenser, and a nitrogen inlet were added bisphenol A (50 g, 219 mmol), bis(4-chlorophenyl) sulfone (22.0 g, 76.7 mmol), sodium hydroxide (20.0 g, 500 mmol), toluene (50 mL), and dimethylsulfoxide (DMSO) (250 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 145-155° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled and the sodium salt of the 2:1 oligomeric hydroxyl compound with a 43% excess of bisphenol A was left in solution to use in further reactions.

Example 43

Synthesis of 2:1 Oligomeric Phthalonitrile Based on Bisphenol-A (43% Excess) and Bis(4-Chlorophenyl) Sulfone in One Reaction Pot Using NaOH To a 500 mL, three-necked flask fitted with a thermometer, a Dean-Stark trap with condenser, and a nitrogen inlet were added bisphenol A (50 g, 219 mmol), bis(4-chlorophenyl) sulfone (22.0 g, 76.7 mmol), sodium hydroxide (20.0 g, 500 mmol), toluene (50 mL), and dimethylsulfoxide (DMSO) (250 mL). Toluene was used to control the refluxing azeotropic removal of water and to control the temperature of the reaction content. The resulting mixture was degassed with nitrogen at ambient temperature and the Dean-Stark trap was filled with toluene. The mixture was refluxed at 145-155° C. under a nitrogen atmosphere for 8-16 h or until no more water was observed being collected in the Dean-Stark trap. The toluene was then slowly distilled off causing the temperature to rise in the reaction vessel to enhance the yield of the intermediate hydroxyl salt and high conversion to this intermediate. The mixture was cooled to 50° C. At this time, 4-nitrophthalonitrile (50.6 g, 292 mmol) was added in one portion and the reaction mixture was heated at 80° C. for 6-8 h. The mixture was allowed to cool to ambient temperature and poured into a 5% aqueous HCl solution resulting in the formation of a solid. The material was broken up and collected using a Büchner funnel. The white solid was washed with 200 mL of a 5% aqueous KOH solution, with 200 mL portions of distilled water until neutral, with 200 mL of a 5% aqueous HCl solution, and finally with 200 mL portions of water until neutral. The isolated solid was vacuum dried to yield the 2:1 oligomeric phthalonitrile and the bisphenol A phthalonitrile composition (100 g, 98% yield).

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:

1. A composition comprising a mixture of:
a first compound having the formula:

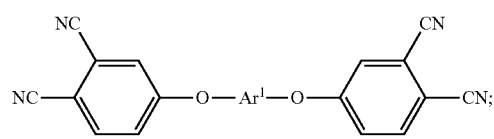

and
a second compound having the formula:

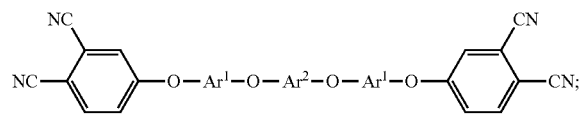

wherein $Ar^1$ and $Ar^2$ are independently selected aromatic groups;
wherein the mole ratio of the first compound to the second compound is at least 1:20.

2. The composition of claim 1, wherein the first compound and the second compound together make up at least 50 mol % of all the phthalonitrile compounds in the composition.

3. The composition of claim 1, wherein $Ar^2$ has an electron-withdrawing group bound to each aromatic ring that is bound to the oxygen atoms that bridge the $Ar^1$ groups to the $Ar^2$ group.

4. The composition of claim 3, wherein the electron-withdrawing group is a carbonyl group, a sulfonyl group, a sulfinyl group, or a phosphoryl group.

5. The composition of claim 1, wherein Ar¹ is a residue from a bisphenol, 2,2-bis(4-hydroxyphenyl)propane, 2,2-bis(4-hydroxyphenyl)-1,1,1,3,3,3-hexafluoropropane, or resorcinol.

6. The composition of claim 1, wherein Ar² is a residue from a dichlorobenzophenone or 4,4'-dichlorobenzophenone.

7. A thermoset made by curing the composition of claim 1.

8. A composition comprising phthalonitrile compounds that comprise at least 5 mol % of the compound:

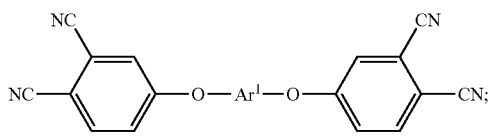

wherein Ar¹ is an aromatic group.

9. The composition of claim 8, wherein Ar¹ is a residue from a bisphenol, 2,2-bis(4-hydroxyphenyl)propane, 2,2-bis(4-hydroxyphenyl)-1,1,1,3,3,3-hexafluoropropane, or resorcinol.

10. A thermoset made by curing the composition of claim 8.

11. A method comprising:
providing a solution comprising:
a dichloroaromatic compound comprising an electron-withdrawing group bound to each aromatic ring containing one of the chloride groups;
a dihydroxyaromatic compound or anion thereof;
wherein the molar ratio of the dihydroxyaromatic compound to the dichloroaromatic compound is greater than 2:1;
an alkaline hydroxide base; and
a solvent; and
heating the solution to react the dichloroaromatic compound and the dihydroxyaromatic compound to form a dimetallic salt of an aromatic ether oligomer;
wherein water formed during the heating is concurrently distilled from the solution.

12. The method of claim 11, wherein the base is sodium hydroxide or potassium hydroxide.

13. The method of claim 11, wherein the electron-withdrawing group is a carbonyl group.

14. The method of claim 11, wherein the electron-withdrawing group is a sulfonyl group, a sulfinyl group, or a phosphoryl group.

15. The method of claim 11, wherein the heating is continued until the reaction yield of the dimetallic salt of the aromatic ether oligomer is at least 90%.

16. The method of claim 11, wherein the molar ratio of the dihydroxyaromatic compound to the dichloroaromatic compound is from greater than 2:1 to 3:1.

17. The method of claim 11, wherein the dichloroaromatic compound is dichlorobenzophenone or 4,4'-dichlorobenzophenone.

18. The method of claim 11, wherein the dihydroxyaromatic compound is a bisphenol, 2,2-bis(4-hydroxyphenyl)propane, 2,2-bis(4-hydroxyphenyl)-1,1,1,3,3,3-hexafluoropropane, or resorcinol.

19. The method of claim 11, wherein the solution further comprises:
an organic transition metal complex or a transition metal salt.

20. The method of claim 19, wherein the organic transition metal complex is an organic copper complex.

21. The method of claim 20, wherein the organic copper complex is $(PPh_3)_3CuBr$.

22. The method of claim 11, wherein the solvent is a mixture of toluene and dimethylsulfoxide.

23. The method of claim 11, wherein the heating is performed at in excess of 150° C.

24. The method of claim 11, further comprising:
reacting the dimetallic salt of the aromatic ether oligomer composition or mixture with 4-nitrophthalonitrile to form a phthalonitrile monomer mixture.

25. The method of claim 24, further comprising:
curing the phthalonitrile monomer mixture to form a phthalonitrile thermoset.

26. The method of claim 25, wherein the curing is performed in the presence of an acid and a curing agent.

27. The method of claim 25, wherein the phthalonitrile monomer is a mixture of phthalonitrile monomers comprising a reaction product of the dimetallic salt of the dihydroxyaromatic compound and 4-nitrophthalonitrile.

* * * * *